April 28, 1970 J. A. GEUSS 3,508,798
BUSHING ASSEMBLY
Filed Sept. 26. 1968 2 Sheets-Sheet 1

INVENTOR.
JOSEPH A. GEUSS
BY
Meyer, Tilberry & Body
ATTORNEYS

April 28, 1970   J. A. GEUSS   3,508,798
BUSHING ASSEMBLY
Filed Sept. 26, 1968   2 Sheets-Sheet 2

INVENTOR.
JOSEPH A. GEUSS
BY Meyer, Tilberry & Body
ATTORNEYS

No. 3,508,798
Patented Apr. 28, 1970

3,508,798
BUSHING ASSEMBLY
Joseph A. Geuss, Erie, Pa., assignor to E. W. Bliss Company, Canton, Ohio, a corporation of Delaware
Filed Sept. 26, 1968, Ser. No. 762,962
Int. Cl. F16c 1/24, 9/00
U.S. Cl. 308—121                                   5 Claims

ABSTRACT OF THE DISCLOSURE

A bearing assembly which includes semi-cylindrical bushing halves and a bearing housing which contains the bushing halves. A plurality of hollow bolts extend radially through the bushing halves and housing securely holding the assembly together and the hollow bolts may be connected to a source of lubricant so that lubricant can be forced into the inside surface of the bushing halves.

DESCRIPTION

The present invention relates to a bearing assembly, and in particular, to a novel means for holding a bushing or bearing sleeve within a bearing cap or housing and lubricating the same.

A principal object of the invention is to provide an improved journal type bearing assembly for use with heavy machinery requiring grease lubrication in the space between the journal and bushing or bearing sleeve.

Conventionally, large bushings or bearing sleeves are split on the center line for installation within a bearing housing, and the latter may comprise semi-cylindrical bearing caps or retainers which are bolted together. With such an arrangement there is the possibility of loss of symmetry in the bushing halves. Frequently, the bushing halves are fastened to the bearing caps by means of screws or dowels, which, however, are incapable of drawing the outside surface of the bushing halves tightly against the inner surfaces of the bearing caps.

Lubrication material, for instance heavy grease, may be piped to the inner space between the journal and the bushing or bearing sleeves by means of a pipe which is tapped into the bearing caps or retainer and in communication with a hole drilled through the bushing. The lubrication is not positive to the inner space, as grease can escape outwardly in the area between the bushing outside surface and the bearing cap or retainer inside surface.

It is known to tap the bushing or bearing sleeve and to extend the lubrication pipe through the bearing cap to the bushing. However, because of high vibration experienced in large machines, the thread connection between the lubrication pipe and the bushing has been known to fail.

The above disadvantages are overcome in accordance with the invention by providing in a bearing assembly which includes a bearing housing, and a bushing within said housing, the combination including means defining drilled holes which are aligned and extend radially through the housing and bushing, bolt means (alternatively herein referred to as lubricating pins) penetrating the holes including an inwardly disposed head end engaging the bushing and an outer exposed threaded end. A nut or other suitable locking means is contained on the exposed threaded end engaging the housing outer surface to draw the housing and bushing together into a close contiguous relationship. A passageway extends through the bolt means or lubricating pin adapted to be in communication with a source of lubricant to introduce the lubricant into the space between the assembly journal and the bushing.

Preferably, the head end of the bolt means or lubricating pin is countersunk into the inside surface of the bushing and is provided with a tapered peripheral surface which engages a funnel-shaped enlargement or cooperating seat formed in the bushing at the inner end of each drilled hole.

The invention and advantages thereof will become apparent upon further consideration of the specification, with reference to the accompanying drawings, in which—

Figure 1:
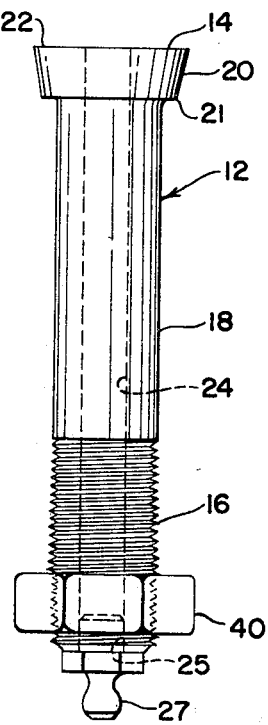
FIGURE 1 is an enlarged elevation view of a lubricating pin in accordance with the invention.

Referring to the drawings, the lubricating pin or bolt means 12 (FIG. 1) comprises a head end 14 and an opposite threaded end 16 with a shank portion 18 between the two ends of sufficient length to extend in a radial direction substantially completely through an inner bushing half or bearing sleeve and an outer bushing member which may be a bearing cap or retainer. The head end is provided with a peripheral tapered surface 20 which faces outwardly relative to the lubricating pin axis and is inwardly sloped in the shape of a truncated cone with the narrowmost diameter portion 21 closest to the pin threaded end. The slope of the tapered surface may be about 10°±1° with respect to the lubricating pin axis, depending upon design considerations, such as load, sizing and speed.

For a nine inch pin the axial length of the threaded end may be about three inches. As an example of other dimensions, the thickness of the head in an axial direction may be about one half an inch, and the head diameter may be about one and one half inches, again depending upon design considerations.

The surface 22 of the head end of the pin, which is furthermost removed from the pin threaded end, is substantially flat, as shown.

Extending axially through the lubricating pin or bolt means is a lubrication hole or passageway 24 exposed at both ends of the lubricating pin and through which a lubricating material may be passed. At the threaded end, the inside diameter of the lubrication passageway is provided with a socket area 25 adapted to receive a suitable lubricating fitting 27.

Figure 2:
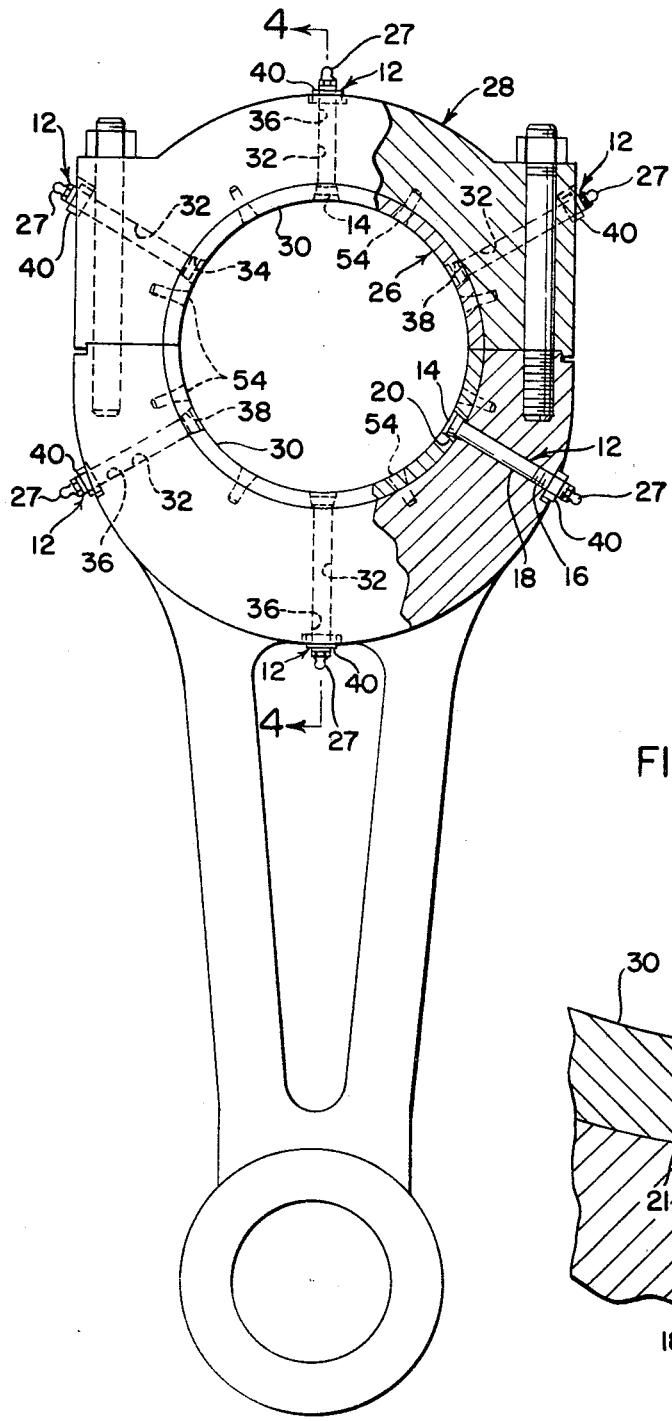
FIGURE 2 is an elevation partially broken away view of a bearing assembly in accordance with the invention.
Figure 3:
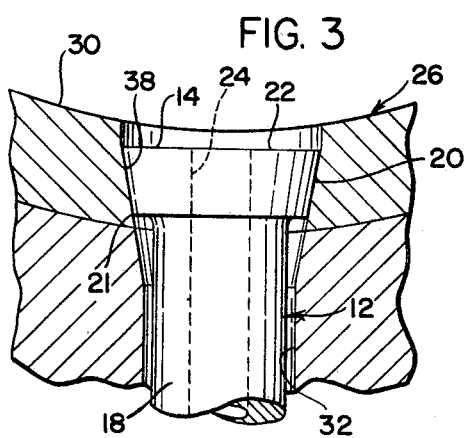
FIGURE 3 is a detailed partial section view illustrating a lubricating pin head end seated within a bushing half in accordance with the invention.

Referring to FIGS. 2 and 3, the bearing assembly comprises bearing sleeve 26 disposed within a suitable housing, in this instance, bearing caps or retainer members 28. The bearing sleeve is in the form of opposed semi-cylindrical bushing halves 30 which are seated within the corresponding semi-cylindrical caps, and the bushing halves and caps are provided with a plurality of spaced radial and aligned openings which define passageways 32 extending radially from an inner journal end 34 outwardly through each bushing half and bearing cap to an outer end 36. The inner journal end of each passageway is suitably machined so as to provide an outwardly (outward from the passageway) tapered funnel-shaped seat 38 (FIG. 3) which engages the tapered surface 20 of the lubricating pin, seating the latter in a countersunk relationship within the passageway journal end. At the exposed threaded end 16 of the lubricating pin, a suitable lock nut 40 (FIG. 2) is provided to draw each bushing half tightly against the inner surface of the corresponding bearing cap or retainer.

Figure 4:
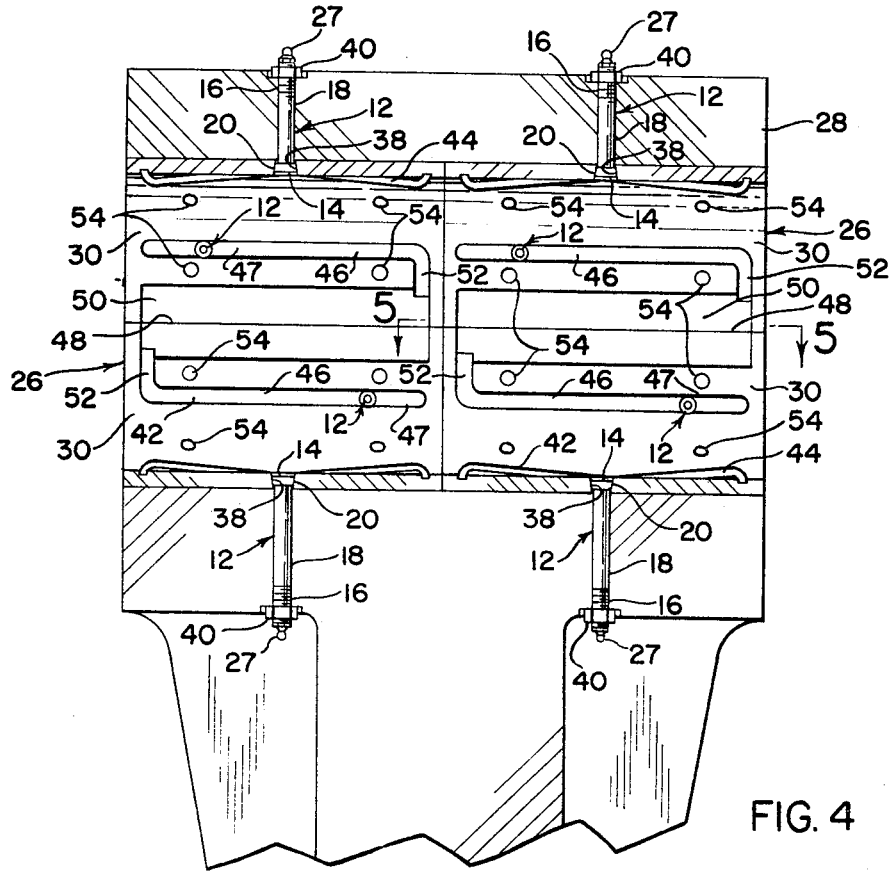
FIGURE 4 is a section view illustrating concepts of the invention.
Figure 5:
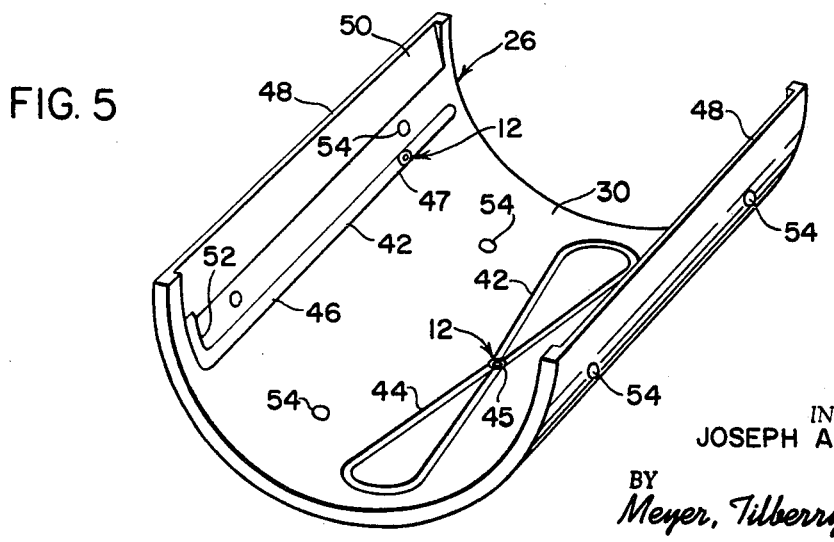
FIGURE 5 is a perspective view showing an arrangement of lubricating grooves in the inner surface of a bearing half.

Extending from the journal ends of the radial passageways in each bushing half are a plurality of lubrication distribution grooves 42 (FIGS. 4 and 5) designed to distribute the lubricant uniformly to the space between a journal and the bushing. In a preferred arrangement, a bushing half will have at least one centrally disposed figure eight groove 44 disposed along the bottom or top of the assembly for distribution of lubricant, and one lubricating pin 12 will be disposed at the intersection point 45 of each figure eight. On opposite sides of the figure eight groove, in each bushing half, there will be provided axially extending grease grooves 46 with lubricating pins 12 positioned at one or the other ends 47 of the grooves. The head ends of the lubricating pins are countersunk below the inner surfaces of the bushing halves a sufficient distance for the free flow of grease into the distribution grooves.

In the embodiment shown, the bushing halves are provided with pairs of edges 48 which abut when the halves are brought together, which edges are machined to provide an axially extending recessed area 50 substantially coextensive with the axial length of each bushing half. The lubrication grooves 46 at the ends 52 remote from the ends 47 are in communication with the recessed areas 50, to provide enlarged pockets of lubricant in the areas of the abutting edges of the bushing halves.

If desired, conventional screws and dowels used in bearing assemblies can be used in combination with the lubricating pin of the present invention for securing the bushing halves or bearing sleeves at points 54 within the bearing caps or retainers.

From the above, it is clear that the lubricating pin of the present invention serves two purposes; one to maintain journal and bushing running clearance; and two, to provide a positive means to introduce lubricant to the space between the bushings and journal. In addition, since there is no threaded end of the pin engaging the bushing or bearing sleeve, failure from vibration is not likely.

What is claimed is:

1. A bearing assembly comprising
   a cylindrical housing;
   a bearing sleeve seated within said housing including an inner contact surface;
   said housing and sleeve defining a plurality of radially extending holes;
   bolt means penetrating the holes including an inwardly disposed head end engaging the bearing sleeve and an outer end removed from said head end;
   locking means engaging said outer end for drawing said housing and bushing together into a close contiguous relationship;
   said bolt means comprising an axially extending passageway for introducing a lubricant to the inner contact surface of said bearing sleeve.

2. The assembly of claim 1 wherein the head end of said bolt means is recessed below the contact surface of said sleeve, further including a plurality of distribution grooves disposed in said contact surface in communication with said bolt means passageway for the distribution of lubricant on said contact surface.

3. The assembly of claim 2 wherein said bolt means head end and passageway have a frusto-conical configuration with the head end securely seated in said passageway.

4. The assembly of claim 1 wherein said sleeve comprises bushing halves.

5. The assembly of claim 1 wherein the passageway of said bolt means adjacent said outer end is threaded for connection to a source of lubricant.

References Cited

UNITED STATES PATENTS 394,407   12/1888   Sibley et al. _____ 308—237

MARTIN P. SCHWADRON, Primary Examiner

F. SUSKO, Assistant Examiner

U.S. Cl. X.R.

308—237